United States Patent
Bailey et al.

(10) Patent No.: US 7,551,323 B2
(45) Date of Patent: Jun. 23, 2009

(54) SYSTEMS AND METHODS FOR ERROR DIFFUSION

(75) Inventors: James Ray Bailey, Shelbyville, KY (US); Curt Paul Breswick, Georgetown, KY (US); David Allen Crutchfield, Lexington, KY (US); Ronald Edward Garnett, Lexington, KY (US); Bob Thai Pham, Richmond, KY (US); James Alan Ward, May's Lick, KY (US)

(73) Assignee: Lexmark International, Inc., Lexington, KY (US)

( * ) Notice: Subject to any disclaimer, the term of this patent is extended or adjusted under 35 U.S.C. 154(b) by 980 days.

(21) Appl. No.: 10/414,854

(22) Filed: Apr. 16, 2003

(65) Prior Publication Data

US 2004/0207879 A1 Oct. 21, 2004

(51) Int. Cl.
*H04N 1/56* (2006.01)
*H04N 1/60* (2006.01)
(52) U.S. Cl. .................. 358/3.03; 358/523; 382/252
(58) Field of Classification Search ............... 358/3.03, 358/3.05, 1.9, 3.01, 3.23, 523, 534, 539; 382/162, 232, 234, 237, 251, 252
See application file for complete search history.

(56) References Cited

U.S. PATENT DOCUMENTS

| | | | |
|---|---|---|---|
| 3,971,044 A | 7/1976 | Findley et al. |
| 4,814,831 A | 3/1989 | Iwamoto |
| 5,051,841 A | 9/1991 | Bowers et al. |
| 5,051,844 A | 9/1991 | Sullivan |
| 5,070,413 A | 12/1991 | Sullivan et al. |
| 5,107,346 A | 4/1992 | Bowers et al. |
| 5,111,218 A | 5/1992 | Lebeau et al. |
| 5,130,823 A | 7/1992 | Bowers |
| 5,218,350 A | 6/1993 | Bollman |
| 5,226,096 A | 7/1993 | Fan |
| 5,243,443 A | 9/1993 | Eschbach |
| 5,276,535 A | 1/1994 | Levien |
| 5,313,287 A | 5/1994 | Barton |

(Continued)

OTHER PUBLICATIONS

Michael T. Brady, "High Speed Multilevel Halftoning Hardware," Proceedings of SPIE, p. 257-263, vol. 4663, (May 16, 2002).

(Continued)

*Primary Examiner*—Thomas D Lee
(74) *Attorney, Agent, or Firm*—Taylor & Aust, PC

(57) ABSTRACT

Error diffusion is performed upon input image data. In one aspect, multiple error diffusion processing elements perform error diffusion on a selected pixel in parallel. In another aspect, the error diffusion logic is integrally formed with a fast local memory in the same electronic device, such as an ASIC. The error data produced by the error diffusion logic for a pixel is buffered in the fast local memory until it is to be used by the error diffusion logic on other pixels. In still another aspect, a first-in-first-out (FIFO) buffer regulates or buffers the color image data between the output of a color conversion system, such as a colorant lookup table, and the input an error diffusion processing element. In yet another aspect, the error diffusion logic has tagging logic that produces and stores an indicator, either in the output data stream itself or in a separate area, to indicate whether a raster contains printable data.

34 Claims, 11 Drawing Sheets

U.S. PATENT DOCUMENTS

| | | | |
|---|---|---|---|
| 5,483,625 A | 1/1996 | Robertson et al. | |
| 5,515,456 A | 5/1996 | Ballard | |
| 5,539,537 A | 7/1996 | Nozawa | |
| 5,581,376 A * | 12/1996 | Harrington | 358/518 |
| 5,604,605 A | 2/1997 | Moolenaar | |
| 5,611,022 A | 3/1997 | Estrada et al. | |
| 5,621,546 A | 4/1997 | Klassen et al. | |
| 5,642,204 A | 6/1997 | Wang | |
| 5,689,294 A | 11/1997 | Karz et al. | |
| 5,692,109 A | 11/1997 | Shu | |
| 5,692,843 A | 12/1997 | Furuya | |
| 5,710,836 A * | 1/1998 | Shiau et al. | 382/237 |
| 5,712,927 A | 1/1998 | Kim et al. | |
| 5,737,453 A | 4/1998 | Ostromoukhov | |
| 5,748,785 A * | 5/1998 | Mantell et al. | 382/237 |
| 5,828,814 A | 10/1998 | Cyman et al. | |
| 5,835,687 A | 11/1998 | Brown et al. | |
| 5,848,224 A * | 12/1998 | Nhu | 358/1.9 |
| 5,854,620 A | 12/1998 | Mills et al. | |
| 5,870,503 A | 2/1999 | Kumashiro | |
| 5,914,729 A | 6/1999 | Lippincott | |
| 5,915,079 A | 6/1999 | Vondran, Jr. et al. | |
| 5,930,010 A * | 7/1999 | Cheung et al. | 358/534 |
| 5,931,960 A | 8/1999 | Kletter et al. | |
| 5,946,455 A | 8/1999 | Tresser et al. | |
| 5,987,270 A | 11/1999 | Hulan et al. | |
| 6,002,804 A | 12/1999 | Bhaskar et al. | |
| 6,002,814 A | 12/1999 | Chadez | |
| 6,016,205 A | 1/2000 | Silverberg et al. | |
| 6,057,933 A | 5/2000 | Hudson et al. | |
| 6,078,343 A | 6/2000 | Jordan | |
| 6,081,344 A | 6/2000 | Bockman et al. | |
| 6,081,653 A | 6/2000 | Zandian | |
| 6,100,998 A | 8/2000 | Nagao et al. | |
| 6,141,114 A | 10/2000 | Mantell et al. | |
| 6,289,138 B1 | 9/2001 | Yip et al. | |
| 6,307,647 B1 | 10/2001 | Cheung et al. | |
| 6,356,362 B1 | 3/2002 | Ostromoukhov | |
| 2002/0051210 A1 | 5/2002 | Ostromoukhov | |
| 2002/0080419 A1 | 6/2002 | Usui et al. | |
| 2002/0145758 A1 | 10/2002 | Lin et al. | |

OTHER PUBLICATIONS

Destiny Embedded Technologies System on a Chip, "D8501 Based Workgroup II Printer Platform" web page, Jan. 15, 2003.

Kang, "Fast Error Diffusion", Proceedings of SPIE, p. 302-309, vol. 4663, (May 16, 2002).

* cited by examiner

FIG. 7

WORD

|   | 2 | 1 | 0 |
|---|---|---|---|
| 3 | $B_4$ | $G_3$ | $R_2$ |
| 2 | $G_4$ | $R_3$ | $B_1$ |
| 1 | $R_4$ | $B_2$ | $G_1$ |
| 0 | $B_3$ | $G_2$ | $R_1$ |

BYTE

FIG. 10A

|  | WORD | | | |
|---|---|---|---|---|
| BYTE | 3 | 2 | 1 | 0 |
| 3 | $B_{n-5}$ | $R_{n-3}$ | $G_{n-2}$ | $B_{n-1}$ |
| 2 | $R_{n-4}$ | $G_{n-3}$ | $B_{n-2}$ | $R_n$ |
| 1 | $G_{n-4}$ | $B_{n-3}$ | $R_{n-1}$ | $G_n$ |
| 0 | $B_{n-4}$ | $R_{n-2}$ | $G_{n-1}$ | $B_n$ |

FIG. 10B

|  | WORD | | | |
|---|---|---|---|---|
| BYTE | 3 | 2 | 1 | 0 |
| 3 | $R_{n-4}$ | $G_{n-3}$ | $B_{n-2}$ | $R_n$ |
| 2 | $G_{n-4}$ | $B_{n-3}$ | $R_{n-1}$ | $G_n$ |
| 1 | $B_{n-4}$ | $R_{n-2}$ | $G_{n-1}$ | $B_n$ |
| 0 | $R_{n-3}$ | $G_{n-2}$ | $B_{n-1}$ | *Pad* |

FIG. 10C

|  | WORD | | | |
|---|---|---|---|---|
| BYTE | 3 | 2 | 1 | 0 |
| 3 | $G_{n-4}$ | $B_{n-3}$ | $R_{n-1}$ | $G_n$ |
| 2 | $B_{n-4}$ | $R_{n-2}$ | $G_{n-1}$ | $B_n$ |
| 1 | $R_{n-3}$ | $G_{n-2}$ | $B_{n-1}$ | *Pad* |
| 0 | $G_{n-3}$ | $B_{n-2}$ | $R_n$ | *Pad* |

FIG. 10D

|  | WORD | | | |
|---|---|---|---|---|
| BYTE | 3 | 2 | 1 | 0 |
| 3 | $B_{n-5}$ | $R_{n-3}$ | $G_{n-2}$ | $B_{n-1}$ |
| 2 | $R_{n-4}$ | $G_{n-3}$ | $B_{n-2}$ | *Pad* |
| 1 | $G_{n-4}$ | $B_{n-3}$ | $R_{n-1}$ | *Pad* |
| 0 | $B_{n-4}$ | $R_{n-2}$ | $G_{n-1}$ | *Pad* |

SYSTEMS AND METHODS FOR ERROR DIFFUSION

BACKGROUND

The present invention is directed to a method, system and apparatus for performing a halftoning process with respect to image data. In particular, the present invention is directed to methods and systems for performing halftoning on image data for output to a display device.

Imaging devices, such as printers and displays, are typically capable of outputting a certain number of colors at each location output. This capability is referred to as the device's "bit-depth."

Halftoning of image data is required whenever the output image bit-depth is smaller than the input image data bit-depth. This situation occurs most often in devices such as printers or multifunction devices (MFDs) where there are most commonly only two possibilities at each physical location: leave paper unprinted or put toner/ink at location. In addition to MFDs, halftoning is also often needed for outputting image data to computer displays, such as cathode ray tube (CRT) or liquid crystal display (LCD) monitors.

As an example, consider a MFD that includes a scanner portion and a printer portion. Some such devices can include a monitor portion for previewing images scanned via the scanner portion or otherwise received from another source such as a computer network connection. The scanner can typically create image scans in various reproductive formats, such as 24 bit RGB, 32 bit CMYK, 8 bit gray, or binary CMYK. The image with multiple levels of gray or color (i.e., a continuous tone image) is rendered from the scanner to the printer in a halftoning process.

To perform optimally, a MFD may require that the scanner generate binary, monochrome, or color data. However, the binary data must include sufficient compensation to enable the printer portion to meet standard copy quality requirements. This function is usually accomplished by building in static color tables or transfer functions for the scanner portion and the printer portion and further modifying the scanned image. Accordingly, autonomous scanning stations may have standard color profiles that a user may select. In addition, vendors may provide software and/or hardware solutions that serve to calibrate the colors and/or gray shading of a scanned image.

Most halftoning methods are spatially based, i.e., they use the human visual system spatial averaging properties that average over a neighborhood of bi-level pixels to provide a sensation of intermediate color level. Typical steps in a rendering process include converting the resolution or DPI (dots per inch) of the digital image to the desired display or print resolution, converting the digital image color space to the display device colorant color space (e.g. RGB to CMYK), and converting the display device colorants to display device dot data. The architecture of the processing element or elements performing this task should produce a high quality transformation that is pleasing to the eye from the digital image to display device while providing high performance at the lowest cost and size possible. Therefore, the algorithms used for each step must be carefully selected and implemented with these goals in mind.

A traditional method of converting the display device colorants to display device dot data is known as error diffusion. This process has been known for many years and was originally derived by Floyd and Steinberg. A description of this process is provided herein for illustrative purposes with reference to FIG. 1. The squares 140 represent the pixels of an input image. The shaded squares 160 represent pixels that have not been processed as yet. Square 110 is an example of a pixel determined to require placement of a dot; square 120 is an example of a pixel determined not require placement of a dot. Square 130 represents the pixel under current examination by the error diffusion process.

As the process progresses, a pixel value associated with the current pixel is compared against a threshold value to determine the output corresponding to the current pixel (dot placement or no dot placement). For instance, assume that the pixel value is in the range of 0-255 as would often be the case for a 256 color gray-scale input image (assuming 0 represents black and 255 represents white), if a threshold value is 127 for a particular pixel, an output of dot placement would occur if the pixel value were 127 or less, and an output of no dot placement would occur if the pixel value were above 127. Next an error associated with this pixel is calculated; the error is calculated by subtracting the particular pixel value from the pixel value associated with the output. To continue with the example, the pixel value would be the error (pixel value –0) if the output were dot placement and would be the pixel value minus 255 if the output were no dot placement. The error is then distributed to neighboring pixel below the current pixel and in front of the current pixel in the direction of error diffusion processing. The neighborhood of pixels to which error is diffused varies depending upon implementation. A common neighborhood of pixels includes the pixel immediately in front of the current pixel (e.g., square 170) and the three pixels immediately below the current pixel (e.g., squares 182, 184 and 186). The calculated error is diffused to the neighborhood according to a weighting scheme that attributes a portion of the error to each pixel in the neighborhood; a typical weighing distributes $7/16$ of the error to the pixel in front (e.g., square 170), $3/16$ to the pixel below and behind (e.g., square 182), $5/16$ to the pixel immediately below (e.g., square 184) and $1/16$ to the pixel below and in front (e.g., square 186).

The present invention provides for systems and methods for improving performance of the error diffusion with respect to an input digital image. The present invention provides such image processing that can meet certain size and performance goals as well as provide the necessary functionality to transform a digital image to printer ink dots or display pixels. Such a print processing can produce a high quality, aesthetically pleasing, transformation from digital image data to printer ink dot data or display pixels while providing high performance in a compact, low cost solution.

SUMMARY

According to exemplary embodiments, a method, system, and apparatus provide processing of a digital image for rendering on a display device. One such embodiment according to the present invention includes a system processor that supports the desired functionality as described in detail below and a system data store (SDS) that stores data associated with this functionality, such as pixel data of an image to be processed (or portions thereof), error values, lookup tables, display device dot values, etc. The system processor is in communication with the SDS.

The SDS may include multiple physical and/or logical data stores for storing the various types of information used. Data storage and retrieval functionality can be provided by either the system processor or one or more data storage processors associated with the SDS. The system processor is in communication with the SDS via any suitable communication channel(s). The system processor may include one or more processing elements that are adapted or programmed to support the desired image processing and/or other functionality.

Accordingly, one exemplary image processing method includes a variety of steps that may, in certain embodiments, be executed by the environment summarized above and more fully described below or be stored as computer executable instructions in and/or on any suitable combination of computer-readable media. In accordance with one illustrative embodiment of the present invention, digital image data is received for rendering by a display device. The resolution of the image data is transformed if the original resolution is not appropriate for the display device. A color space conversion of the image data occurs if the color space for the display device is not the same as that of the image data. The error diffusion process is performed upon the input image to yield the image in a format suitable for rendering by the particular display device. In one exemplary embodiment, a modified Floyd-Steinberg error diffusion algorithm can be used to disperse errors pseudo-randomly.

In one aspect of the invention, a plurality of error diffusion processing elements perform error diffusion on a selected pixel in parallel with respect to two or more colorant values associated with the selected pixel In another aspect of the invention, the error diffusion logic is integrally formed with a fast local memory in the same electronic device, such as an ASIC. The error data produced by the error diffusion logic for a pixel is buffered in the fast local memory until it is to be used by the error diffusion logic on other pixels.

In still another aspect of the invention, a first-in-first-out (FIFO) buffer regulates or buffers the color image data between the output of a color conversion system, such as a colorant lookup table, and the input of an error diffusion processing element.

In yet another aspect of the invention, the error diffusion logic has tagging logic that produces and stores an indicator, either in the output data stream itself or in a separate area, to indicate whether a raster contains printable data.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 7 depicts the grouping of forward direction 24-bit RGB data within three 32-bit words.

FIG. 10A is a table illustrating the first four words burst in reverse if the number of pixels per line ("#pixels"), modulo 4 ("%4"), equals 0.

FIG. 10B is a table illustrating the first four words burst in reverse if #pixels %4=3.

FIG. 10C is a table illustrating the first four words burst in reverse if #pixels %4=2.

FIG. 10D is a table illustrating the first four words burst in reverse if #pixels %4=1.

DETAILED DESCRIPTION

Figure 1:
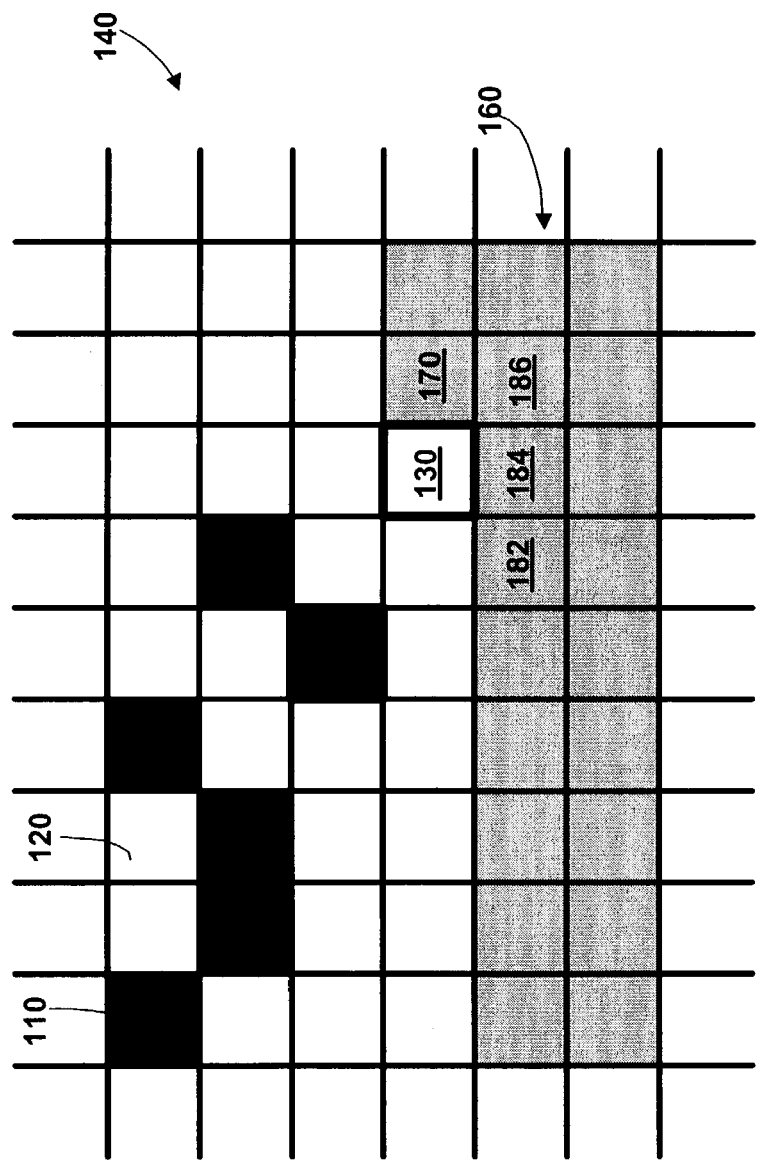
FIG. 1 is a diagram depicting a partially processed digital image undergoing error diffusion.

Exemplary embodiments of the present invention are now described in detail. Referring to the drawings, like numbers indicate like parts throughout the views. According to exemplary embodiments, image data processing is provided for image data in any input/output device, e.g., a scanner, a printer, a display, or combination devices. For illustrative purposes, much of the description below relates to image data processing in a multifunction device including a scanner/printer. It will be appreciated, however, that the invention is not limited to this implementation. Rather, the image data correction may be applied to image data input/output from any imaging device.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Hardware Architecture

The image processing system can include a system data store (SDS) and a system processor having multiple processing elements. The term processing element refers to (1) a process running on a particular piece, or across particular pieces, of processing hardware, (2) a particular piece of processing hardware, or either (1) or (2) as the context allows.

In one embodiment, the system processor includes an embedded ARM processor that can fetch and execute instructions and/or firmware from an SDS. These instructions can direct the embedded processor to configure components included within the ASIC hardware. Nevertheless, in other embodiments, each processing element can be embodied in one or more field programmable gate arrays (FPGAs), digital signal processors (DSPs) and/or application specific integrated circuits (ASICs) configured to perform at least a portion of the functionality according to the present invention.

Each processing element can be supported via a standard general purpose processor such as an Intel-compatible processor platform.

In some embodiments, the system processor can include a combination of general purpose processors, ASICs, DSPs and/or FPGAs. In some embodiments, image processing functionality, as further described below, can be distributed across multiple processing elements. In some such embodiments, aspects of the functionality or portions thereof may be executed in series or in parallel; particular functionality or portions thereof executed multiple times may also occur in series or parallel.

The SDS can include a variety of primary and secondary storage elements. In one exemplary embodiment, the SDS can include random access memory (RAM) as part of the primary storage; the amount of RAM can range from 8 MB to 128 MB in some embodiments. The primary storage can, in some embodiments, include other forms of memory such as cache memory, registers, non-volatile memory (e.g., FLASH, ROM, EPROM, etc.), etc.

The SDS can also include secondary storage including single, multiple and/or varied servers and storage elements. For example, the SDS can use internal storage devices connected to the system processor. In embodiments where a single processing element supports all of the system functionality, a local hard disk drive can serve as the secondary storage of the SDS, and a disk operating system executing on such a single processing element can act as a data server receiving and servicing data requests. A system bus can serve as the communication channel between the system processor and the SDS (typically, at least registers, RAM and the hard disk drive).

It will be understood by those skilled in the art that the different information used in the image processing according to the present invention can be logically or physically segregated within a single device serving as primary or secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located, or distributed across a variety of diverse locations. The architecture of the secondary storage of the system data store may vary significantly in different embodiments.

In several embodiments, a variety of storage devices/file servers that may include one or more standard magnetic and/or optical disk drives using any appropriate interface including, without limitation, ATA, IDE and SCSI can be used to store and manipulate the data.

The data stored in the SDS can be according to conventionally known structures including databases, tables (e.g., hash, lookup, etc.), flat files or combinations of such architectures. Such alternative approaches may use data servers other than database management systems such as a hash table look-up server, procedure and/or process and/or a flat file retrieval server, procedure and/or process.

The SDS communicates with the system processor by one or more communication channels. Multiple channels can be involved in some embodiments for supporting communication between processing elements of the system processor and portions of the SDS. Such channels can include without limitation on or off-chip bus connection, computer network, direct dial-up connection, dedicated connection, direct or indirect connection such as via a bus connection, parallel or serial connection, USB connection or other suitable channel as would be known to those skilled in the art.

Parallel Processing

Figure 2:
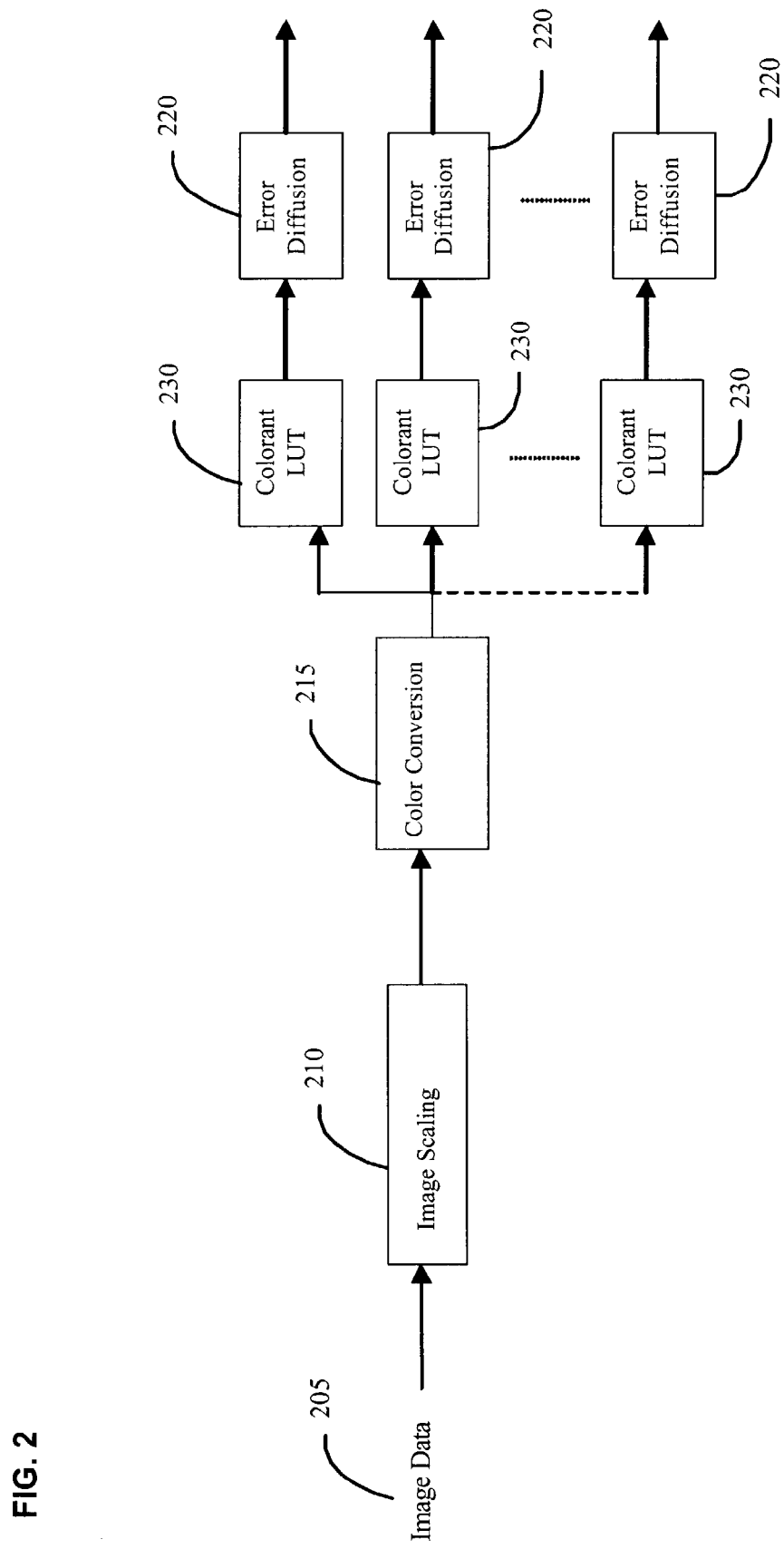
FIG. 2 is a block diagram of elements in an image processing pipeline using parallel error diffusion processing elements.
Figure 3:
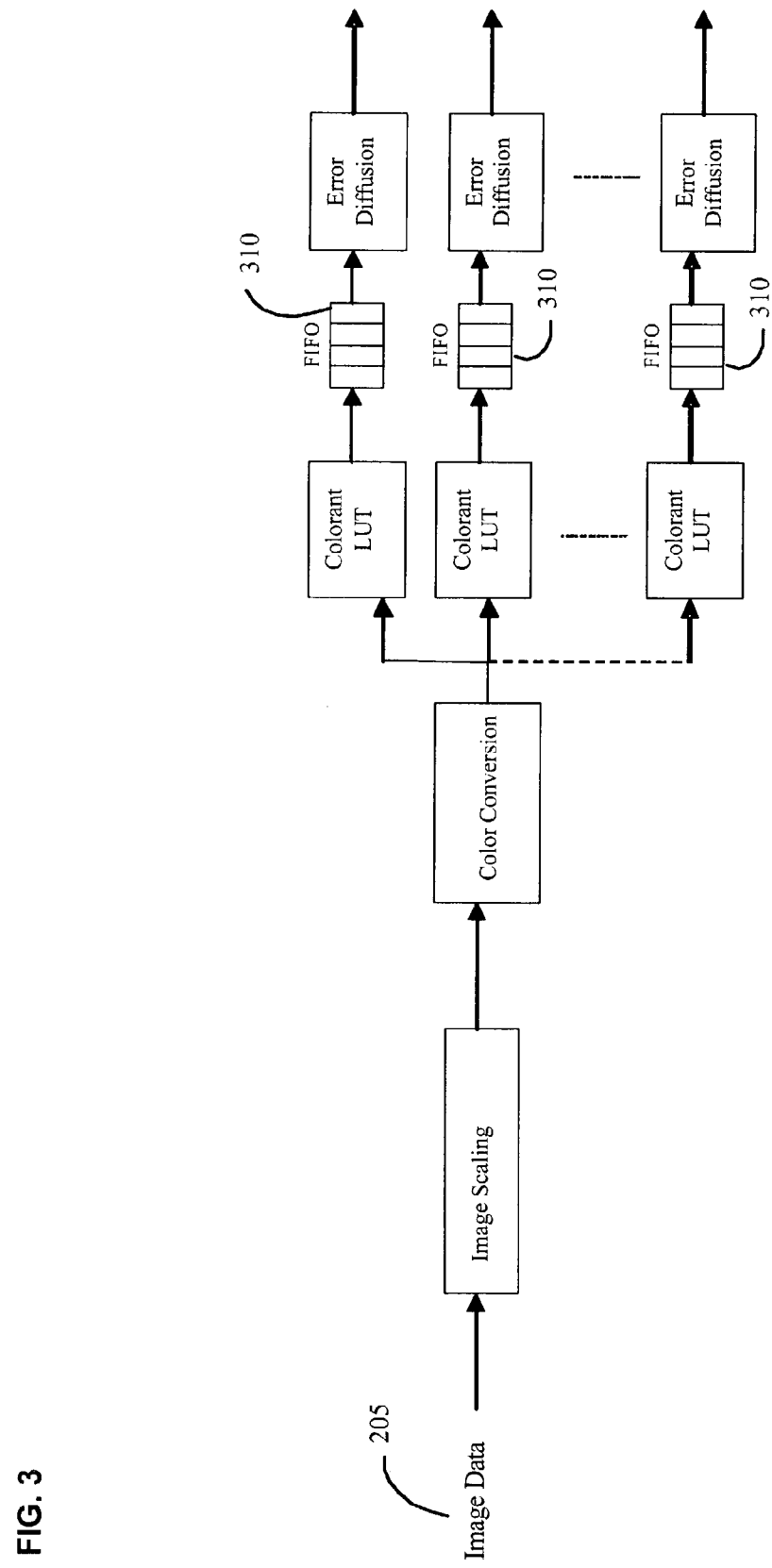
FIG. 3 is a block diagram of elements in an image processing pipeline using parallel error diffusion processing elements with FIFO buffers inserted to improve throughput.

In one exemplary embodiment of the present invention, multiple error diffusion elements can be used to perform error diffusion on a selected pixel in parallel, as illustrated in FIGS. 2 and 3.

As illustrated in FIG. 2, image data 205 is scaled by a processor element 210 to the desired output resolution. The scaled pixel data is input to a processor element 215 to perform interpolation and generate a colorant lookup table address. The colorant lookup table address is referenced by multiple processor elements 230 to retrieve a pixel colorant value for each processed channel. Error diffusion elements 220 receive pixel colorant values and perform error diffusion on those pixels.

A hardware error diffusion algorithm can be used to transform the colorant value to printer ink dot data. Input to the error diffusion elements can be multi-bit pixel colorant information. The bit depth of the pixel colorant information can be varied according to the application. In one exemplary embodiment, 8-bit colorant data is input to the error diffusion elements. Additionally, the error diffusion elements can output dot values of an appropriate bit-depth. In one exemplary embodiment directed to a printer, the output is a one bit or two bit printer ink dot value. Other embodiments directed to screen display can output alternative display pixel values as appropriate.

In some exemplary embodiments, multiple error diffusion processing elements can be used to perform error diffusion on a selected pixel in parallel with respect to multiple colorant values associated with the selected pixel. As a non-limiting example, if pixel colorant values from two channels are available, separate error diffusion processing elements can be used to process data from each channel simultaneously. In some alternative embodiments, four parallel error diffusion processing elements can be used to process four channels from one pixel or three channels from one pixel and one channel from another pixel. Similarly, a two channel embodiment could be used to simultaneously process one channel from one pixel and one channel from another pixel in parallel. One skilled in the art will recognize that other variations are possible. One skilled in the art will also recognize that the number of error diffusion processing elements in parallel can be increased to simultaneously process any number of channels as appropriate. Error diffusion processing elements can be used to enable hardware color masking to be applied to any color set to enhance the color output range of a printing device as disclosed in commonly assigned U.S. Pat. Nos. 6,363,172 and 5,973,803, the contents of which are hereby incorporated in their entirety. Parallel error diffusion processing elements can also perform the above described masking function.

In one exemplary embodiment, the error diffusion processing elements can receive a pixel colorant value from a colorant lookup table processing element. A processing element can retrieve a pixel colorant value from a colorant lookup table based on a colorant lookup table address. The table of the present invention can reside in the SDS and can be accessed as necessary by one or more processing elements. In one exemplary embodiment, the colorant lookup table is stored as a three-dimensional table. In some embodiments, enhanced performance can be achieved when all relevant colorant lookup tables are loaded into a local SRAM. In such an embodiment, one input pixel can be converted per clock cycle for a given colorant. Some embodiments of the system architecture depicted in FIG. 2 can use 3-D lookup tables with stochastic interpolation.

Any number of colorant lookup tables and/or error diffusion processing elements can be placed in parallel to process a given pixel. In one exemplary embodiment, each error diffusion processing element is communicatively coupled with a colorant lookup table. One such exemplary embodiment is depicted in FIG. 2. Alternatively, multiple parallel error diffusion processing elements can be coupled with fewer colorant lookup tables such that more than one colorant lookup table will be communicatively coupled with one error diffusion processing element.

The number of parallel colorant lookup tables and error diffusion processing elements in part determine the number of times pixel data needs to be processed by the present invention to complete color conversion. As a non-limiting example, to convert RGB to CMYK, four parallel colorant lookup tables and error diffusion processing elements can be used if the input image is to be processed only once. As a non-limiting example, if two parallel colorant lookup tables and error diffusion processing elements are enabled, then the input image must be processed twice to obtain all four colorant outputs. Other combinations of colorant lookup tables and error diffusion processing elements known to one skilled in the art are possible.

The present invention can perform interpolation on pixel data and thereby compute a color lookup table address. The computed address can be the same for each colorant (e.g. cyan, magenta, yellow, etc). Therefore, the single computed address can be used to retrieve multiple colorant outputs from multiple color tables. Thus, some or all pixel colorant values can be computed in parallel. One exemplary embodiment of the present invention can utilize Neighborhood Mask Dither Interpolation (NMDI) as disclosed in commonly assigned U.S. patent application Ser. No. 09/626,709, entitled "Dithered Quantization Using Neighborhood Mask Array to Approximate Interpolation," which application is hereby incorporated herein in its entirety by this reference. This method of interpolation can improve the quality of the image resolution due to the dithering nature of the interpolation. Such a method can increase hardware performance, reduce overhead and obtain results comparable to trilinear interpolation, although other forms of interpolation such as trilinear interpolation can be used in some embodiments. NMDI color conversion can also be used to reduce the artifacts associated with error diffusion such as "worms" as well as aliasing.

Figure 11:
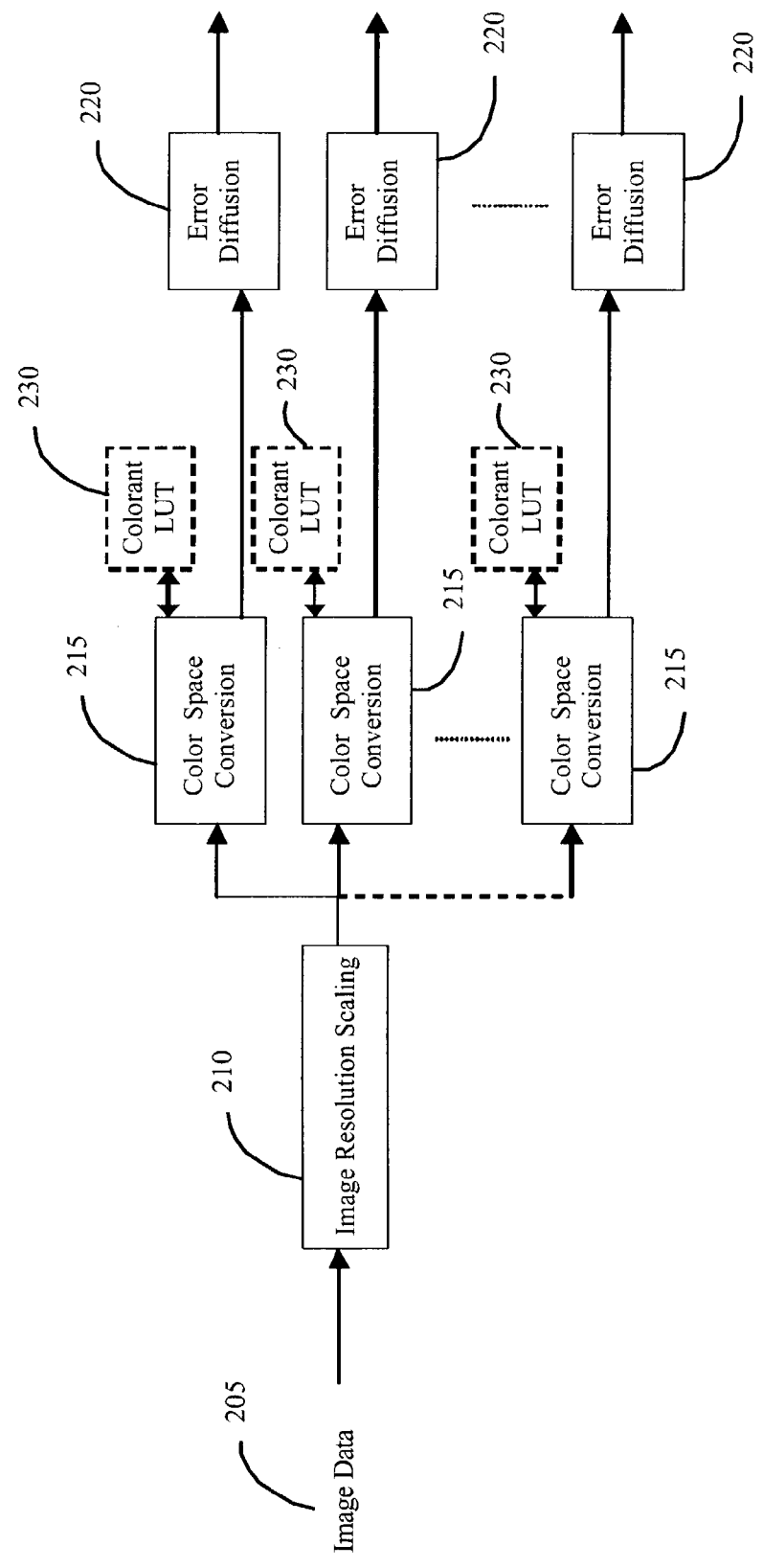
FIG. 11 is a block diagram of elements in an image processing pipeline using parallel error diffusion processing elements and optional colorant lookup tables.

Some embodiments can use other algorithms for color conversion, including trilinear or tetrahedral interpolation. One such architecture is depicted in FIG. 11. In this embodiment, the output of color conversion 215 is not fed from the LUT 230 but rather is fed from the color conversion block 215 itself. Multiple parallel color conversion modules can be employed. In such an embodiment, the colorant LUT is optional and need not be included in the system architecture.

Embodiments employing trilinear interpolation can read out the eight vertices of the color space cube (nearest known neighbors), perform calculations on these neighbors to derive the resultant pixel, and then output the calculated result. There are several interpolation techniques that can be used for color conversion using 3-D lookup tables with interpolation including three-dimensional interpolation using cellular regression or sequential linear interpolation. These embodiments can be implemented using the system architecture depicted in FIG. 11.

Some embodiments do not include any colorant look up tables 230. In such embodiments, the color conversion may be based on calculations performed by the system of the present invention. In some of these embodiments, inverse color transformation can be used as the color conversion algorithm.

If an image at input to the system of the present invention is not at the final output resolution, the image can be scaled to the final output resolution. One exemplary embodiment of the present invention can scale to a given resolution by replicating image pixels in the vertical and/or horizontal directions independently. One exemplary embodiment does not alter the bit depth of the replicated pixels. As a non-limiting example, embodiments capable of pixel replication in at least one dimension can correct images acquired using asymmetrical resolutions (e.g. an image scanned in at 600×1200) by using asymmetrical direction replications. One exemplary embodiment of the present invention performs image scaling before interpolation. In some embodiments the amount of scaling or replication can be configured for each dimension.

Some embodiments of the present invention can include one or more fast local memories, as described below. The same input RGB image data can be converted to multiple color spaces (CMY, CMYK, etc.) and halftoned concurrently in order to increase performance. If each of the parallel error diffusion processing elements also generated reads and writes to system storage for error values, it would greatly reduce the overall performance impact of the parallelism. However, by instantiating a fast local memory for error values for each of the error diffusion blocks, processing performance is increased with only a small increase in system storage transactions.

Further, in some such embodiments that have multiple error diffusion processing elements, each with a local error buffer, it would be possible to link the error buffers together so that a single error diffusion processing element could operate on very long lines of image data without resorting to spilling errors into system storage, as described below.

In addition, various embodiments of the invention can combine the parallel error diffusion processing elements with one or more of the other error diffusion enhancements discussed below, including without limitation, line reversal, buffering, edge tags, and fast local memory.

Line Reversal

In one exemplary embodiment, the error diffusion processing element can detect the beginning or end of a raster line, depending on direction, and automatically reinitialize in such a way that it can move in the opposite direction starting either at the beginning or the end of the new line. By enabling the processing element to perform the automatic line reversal, the processing element and other portions of the system processor can set the data stream for the image, set the appropriate bits in hardware registers and then wait for an interrupt from the hardware when the entire given image has been processed. The system processor need not reinitialize the controlling registers for each line. Therefore, the controlling overhead has been reduced for processing an image. This is important because it allows the remainder of the system processor to perform other tasks while the image is being processed.

Figure 6:
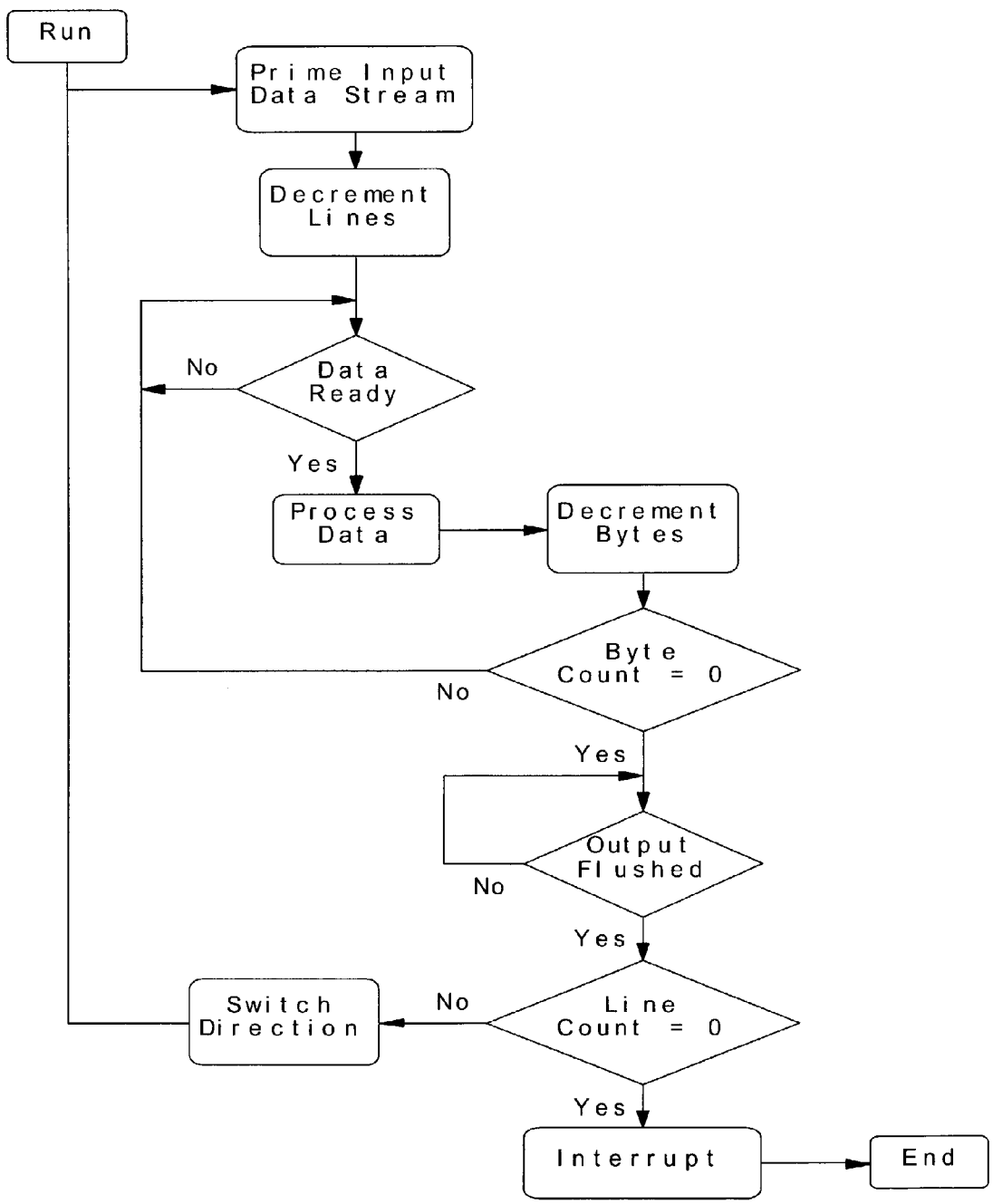
FIG. 6 is a flow chart for bidirectionally processing lines of a digital image.

In an exemplary embodiment, the error diffusion processing element contains a controlling state machine. This state machine is responsible for controlling the data flow through the error diffusion function. It ensures that the input data stream of both errors and source pixels are primed and available before allowing operation. It also ensures that the output data stream is ready to take the processed bytes. FIG. 6 is a flow chart of operations performed by the controlling state machine.

Also contained within the error diffusion processing element are two counters. The first counter represents the number of bytes to process for each raster line. The second counter represents the number of lines to process for the entire image. Both counters are down counters and are initialized through register space by the processing element, or other portion of the system processor. The processing element, or other portion of the system processor, is also responsible for enabling the operation through register space. In an exemplary embodiment this is simply setting a bit that informs the state machine that processing can begin.

When enabled, the byte counter decrements for each image byte processed. The state machine waits for the byte counter to reach zero. At this point the state machine will wait for the output stream of the current line to empty and then prime the input data stream for the next line. The state machine will also change the direction via the controlling registers. Upon successful re-initialization the state machine decrements the line counter. This process continues until the line counter reaches zero. An interrupt signal is asserted to the system processor informing it that the process has completed at this point.

In some embodiments, the priming input data stream step (see FIG. 6) retrieves data starting at the front or the back of the raster line and also receiving error data depending on direction. If the error diffusion processing element is ready to move in the reverse direction then it is necessary to retrieve data starting at the end of the next raster line. Conversely, if the error diffusion processing element is ready to move in the forward direction, then it is necessary to retrieve data from the start of the next raster line.

In one exemplary embodiment, the input and output data streams comprise multiple elements. For input, the current source pixel being processed and the error from the previous line are needed before processing can take place. The error is provided through a direct memory access (DMA) interface and the source pixel can be provided by a color conversion operation. However, the input stream could be any interface to provide the errors and source pixels to the error diffusion processing element. For output, the dots and next line errors are to be written out into a memory device through a DMA controller. Again, the output stream interface could be to other functions or provided in varied forms for further processing.

By enabling the error diffusion processing element to automatically "snake" an image, line initialization overhead can be eliminated. (The method of processing lines in alternating directions is sometimes referred to in the art as "snaking" the image.) For print processors that serially feed the color converted data from a color conversion processing element to an error diffusion processing element, it is desirable that the color converted data raster lines be processed by error diffusion in alternating directions without a performance penalty. Color conversion will convert each input image pixel to a printer colorant and output this colorant to error diffusion. In order to alternate the direction of the output raster lines from color conversion without a performance penalty, the input raster line must be processed in alternating directions. This requires reversing an input image line before it is input into the image processing pipeline.

Further complicating this task is the nature of the image data received from memory. For standalone printers, the input image data typically is composed of 24-bit pixels (e.g. 24-bit RGB pixels, 24-bit YCC pixels, etc). However, the data bus from memory is typically 32-bits in width with data being received in bursts of one, four, eight, or sixteen words. Thus, for every word received from memory there exist 1.33 pixels worth of image data. The 24-bit image data must be reconstructed from 32-bit word bursts in both the forward and reverse directions. As a further enhancement to snaking, a method for reconstructing 24-bit interleaved image data from 32-bit word bursts from memory as well as a method for automatically reversing the direction of an interleaved input image line for in a system processor performing image processing is provided hereinbelow.

Figure 8:
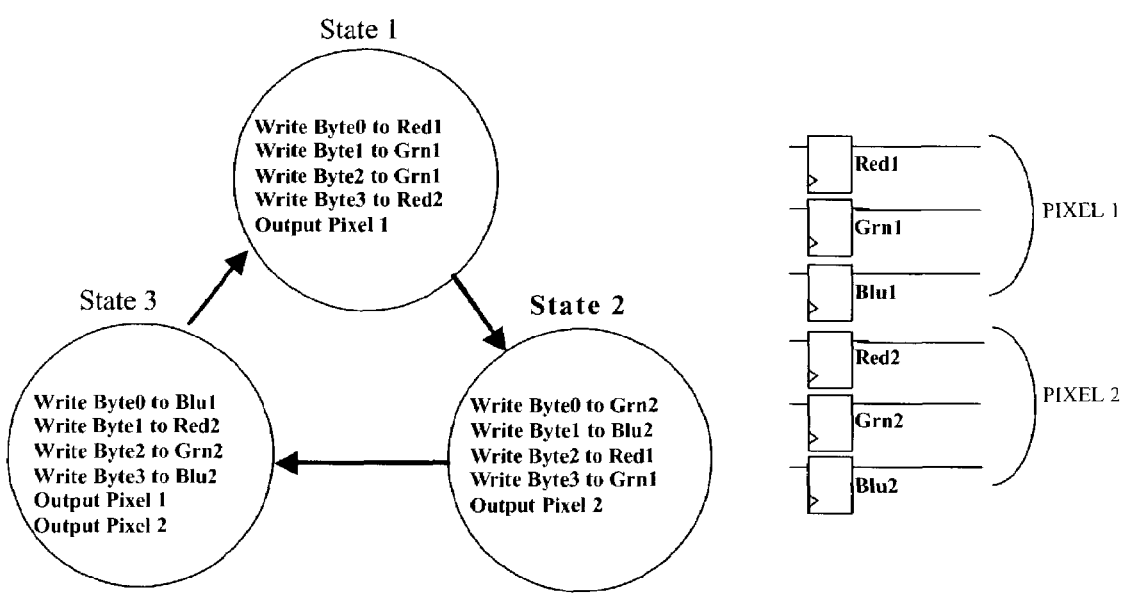
FIG. 8 depicts a state machine for forward direction pixel construction logic.

In an exemplary embodiment, a DMA module is utilized to burst the image data forward through memory in 32-bit word bursts in order to input an image raster line in the forward direction. Further, in such an exemplary embodiment, the input image data is interleaved in memory. To reconstruct 24-bit image data from 32-bit word forward bursts, the first thing to recognize is the pattern as to which the image data resides within the 32-bit words. FIG. 7 shows the location of 24-bit RGB image data within three 32-bit words burst in the forward direction. For every three 32-bit words, there exist four pixels and the pattern then repeats. Given one input 32-bit word per clock cycle, the maximum number of pixels that can be constructed in three clock cycles is four pixels. In order to achieve this performance, six 8-bit registers can be used in conjunction with a processing element implementing a state machine as shown in FIG. 8.

Once all three color components have been written, the pixel is output. The exemplary embodiment utilizes storage for two pixels in order to process one word per clock cycle (since all four bytes can be stored from the word in the appropriate location so that the next input word may be processed). States 1 and 2 in the state machine construct and output one pixel. State 3 constructs and outputs two pixels. Thus, four pixels can be output in three clock cycles. A 24-bit image raster line can be reconstructed at a rate of four pixels per three clock cycles in the forward direction using this method.

In the exemplary embodiment, a DMA module is utilized to burst the image raster line backward through memory. This is accomplished by bursting n-words forward, stepping back n*2 words and repeating. In the exemplary embodiment, 16-word bursts are used but this technique is applicable to any number of word bursts. The reverse pixel data will be contained within 32-bit word bursts, the same as with forward pixel data. However, with backward word bursts the pixel color components will be located at different locations within the 32-bit words than with forward word bursts. For input image data that is interleaved in memory, it is common for each line to end on a word or multiple word boundary. Thus, there exists a pad between lines. In the exemplary embodiment, the first word that is processed in reverse is the last word in the raster line that contains valid image data. Due to this fact, the first word burst in should contain all or part of the last pixel in the input image raster line. There may or may not be extra invalid bytes (padding) within this word. For example, if the first word burst in reverse contains only the "blue" byte of the last RGB pixel in the raster line, then that word will also contain three invalid or padded bytes. All possible scenarios must be considered for the initial word burst in reverse from memory.

It can be determined which scenario will occur by looking at the number of input pixels per image raster line modulo 4 (note that the symbol "%" represents the modulo operator in the following list, and "#pixels" represents the number of input pixels per image line):

If #pixels %4=0, then the first four words burst in reverse will be those in FIG. 10A.

If #pixels %4=3, then the first four words burst in reverse will be those in FIG. 10B.

If #pixels %4=2, then the first four words burst in reverse will be those in FIG. 10C.

If #pixels %4=1, then the first four words burst in reverse will be those in FIG. 10D.

In the exemplary embodiment, six 8-bit registers are used in conjunction with the control logic (state machine) in order to reconstruct the image data from reverse word bursts (FIG. 8). By recognizing the pattern of four pixels per three 32-bit words, the image data can be reconstructed in the reverse direction. The exemplary embodiment contains the detection of one of the four possible scenarios for the initial word reverse burst by utilizing states 1-3 in the state machine shown in FIG. 9. By computing the number of pixels per input image line modulo 4 (#pixels %4), the exemplary embodiment can determine what image data the first word will contain and properly reconstruct the image data in the reverse direction. States 4-6 reconstruct the four image pixels per three clock cycles in the reverse direction. Thus, the image line is reversed at an optimal rate.

Figure 9:
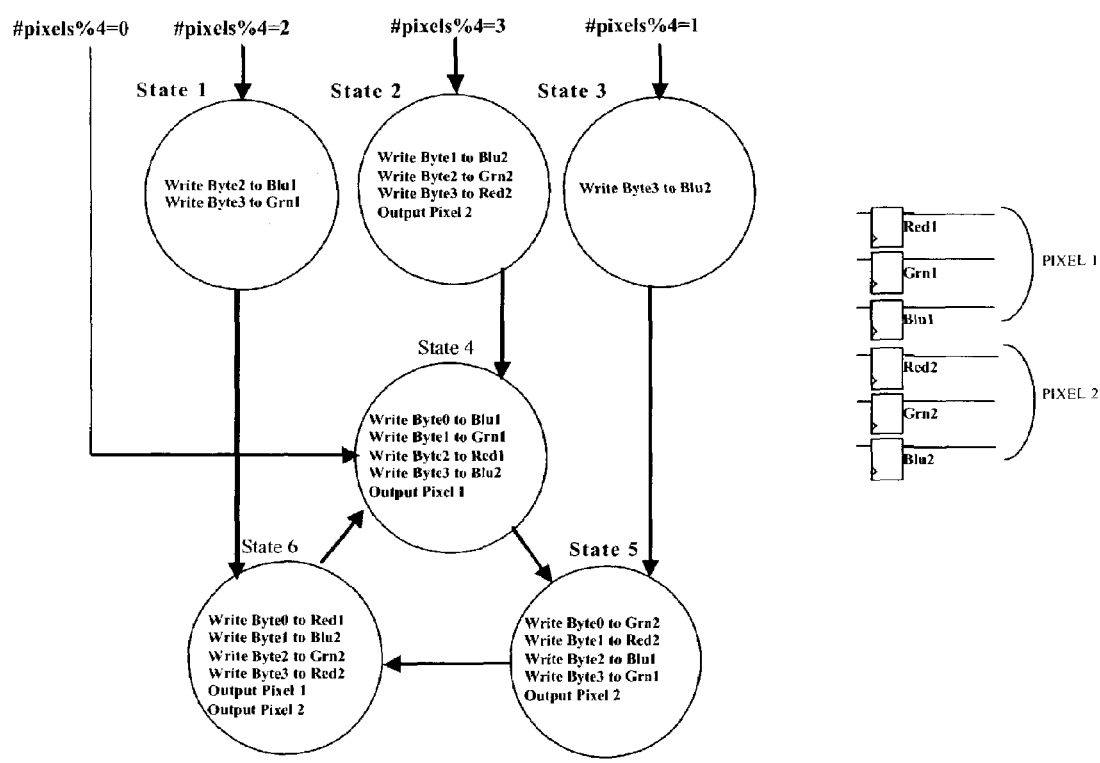
FIG. 9 depicts a state machine for reverse direction pixel construction logic.

In summary, in the exemplary embodiment, the six registers in FIGS. 8 and 9 are shared, and the state machines are combined to form the overall control logic for reconstructing the image data in both the forward and backward directions. By utilizing this method, input image raster lines can be fed in both directions without the overhead and performance penalty of buffering an entire input image line and without requiring the system processor to reinitialize the controlling registers for each line. Device overhead can be reduced by automating the determination of good and bad data for the first word in the reverse direction. Performance is maximized by the use of two pixel registers to obtain a reconstruction rate of four pixels per three input words. Although in the exemplary embodiment the image data are 24-bit RGB data, the above-described method applies to any 24-bit image comprising three 8-bit components, such as YCC or HVC color spaces.

In addition, various embodiments of the invention can combine line reversal with one or more of the other error diffusion enhancements discussed herein, including without limitation, the parallel error diffusion processing elements as discussed above, and the buffering, edge tags, and fast local memory as discussed below.

Buffering

In some embodiments, one or more first-in first-out (FIFO) buffers 310 can be disposed between the processing elements responsible for colorant lookup and for error diffusion, as illustrated in FIG. 3. In image data processing, it is desirable to relieve throughput bottlenecks in order to prevent tasks from becoming idle. The overhead associated with bursting data into and out of different portions of the SDS can create substantial idle time for each error diffusion processing element. Such idle time is detrimental to performance of the system processor and can be reduced through the introduction of one or more FIFO buffers.

The present invention can include systems and methods to reduce processing idle time and increase the throughput and performance of the system processor through inclusion of one or more FIFO buffers. In some embodiments, mixed mode DMA burst lengths can be used to accelerate SDS service requests and data throughput. Some embodiments of the present invention can utilize a DMA controller 235 to input and output data to and from a system processor. In some such embodiments, idle time is a result of a system processor waiting for servicing by the DMA controller 235. If there is no data ready for immediate processing, the amount of time it takes to service an input burst request results in processing idle time and thus wasted clock cycles that could have been spent processing data.

If an output buffer of a colorant lookup table is filled and no more data can be processed until it is emptied, then the amount of time it takes to service an output burst request results in processing idle time. If the output buffer is filled, then the input buffer of the colorant lookup table may not be able to be emptied out to allow for any more input bursts, thus causing even more unwanted idle time. In one exemplary embodiment, a FIFO buffer is placed between the color conversion module and the error diffusion module in order to minimize the amount of time the print processor is idle.

Such a buffer provides storage for the output of the colorant lookup table so that the colorant lookup table input data buffer can be processed and emptied. This allows more data to be burst in from memory regardless of the status of the output buffer. The FIFO improves the performance of the print processor by providing input to error diffusion processing elements as fast as the colorant lookup tables can make it available. As a non-limiting example, when the output buffer is filled and the error diffusion processing elements are idle while waiting for an output burst service from DMA controller 235, the colorant lookup tables can still operate on input data preventing them from becoming idle. Output from the colorant lookup tables can be processed by the error diffusion processing elements while colorant lookup tables are idle when waiting for an input burst service from DMA controller 235.

The processor architecture described above can employ parallel colorant lookup tables and error diffusion processing elements. In one exemplary embodiment, a FIFO buffer can be placed on the output of any colorant lookup table. One such embodiment is depicted in FIG. 3. In addition to allowing colorant lookup tables to process their entire input buffers, the buffer allows each error diffusion processing element to operate independently. In this way, one error diffusion processing element can process data while another waits for an output service request from a DMA controller 235.

Input and output data service requests to a DMA controller incur a performance penalty. Some embodiments of the present invention can employ memory controllers to reduce DMA service penalties. The data transformation in the present invention will produce more input service requests than output service requests.

Therefore, in one exemplary embodiment of the present invention, mixed mode burst lengths can be employed to reduce the number of input service requests. As a non-limiting example, one exemplary embodiment utilizes 16 32-bit word bursts into color conversion to produce 21.33 24-bit interleaved image pixels. For every 16-word burst, 21.33 8-bit colorant bytes can be produced from each colorant conversion. In one exemplary embodiment, the 8-bit colorant bytes can be stored in the FIFO between colorant lookup tables and error diffusion processing elements. Error diffusion processing elements can then transform these 8-bit colorants to one or two bits representing printer ink dot data or pixel display data. Thus, for every 16-word input burst, 21.33 one-bit values or 42.66 values are output from error diffusion. In one exemplary embodiment, these bits are stored in the output buffer and burst out in four 32-bit word burst lengths. Because data is substantially reduced during processing, a smaller output burst length is sufficient to achieve desired performance without the overhead associated with larger output bursts and larger output burst buffers. In one exemplary embodiment, for every six 32-word input bursts, there can be one 4-word output burst of 1-bit dot data or two 4-word output bursts of 2-bit dot data. Without the use of increased burst lengths on the input, more input bursts would be required for one 4-word output burst. This would result in more memory controller overhead and more processing idle time.

Mixed mode bursting can be used to reduce memory controller penalties and improves overall performance of the system processor. One exemplary embodiment employs 16-word bursts input and 4-word bursts output. One skilled in the art will recognize that this technique can be applied to any combination of bursts lengths where the input lengths are greater than the output lengths.

In one exemplary embodiment, mixed mode memory bursts can be employed in addition to placing one or more FIFO buffers between each error diffusion processing element and colorant lookup table. The size of the buffer placed on the input of each error diffusion processing element can be equal to the number of output bytes the colorant lookup table will produce for one input burst. As a non-limiting example, for a 16-word input burst, 21 24-bit image pixels can be produced. Color conversion can transform these 21 image pixels to 21 bytes. In this example, a 21-byte buffer can be used to allow the colorant lookup table to empty its input buffer to allow more data to be burst in. For systems which include image scaling functionality such as that described above, the size of the buffer can be equal to the number of output bytes from colorant lookup table multiplied by the maximum number of scaled pixels. Thereby, the input buffer will be emptied into the FIFO buffer for each input service request. One skilled in the art will recognize that other buffer sizes are possible.

In addition, various embodiments of the invention can combine buffering with one or more of the other error diffusion enhancements discussed herein, including without limitation, the parallel error diffusion processing elements and line reversal as discussed above, and the edge tags and fast local memory as discussed below.

Edge Tags

A further enhancement to the error diffusion processing is use of an indicator or edge tag to indicate whether a raster includes printable data. In some embodiments of the invention, the indicators can be placed within the output data stream itself. In other embodiments, the indicators can be placed in a memory space separate from the output image data.

In embodiments in which the indicator is placed in the data stream, the indicator can be placed at the beginning or end of a line, depending on the processing direction. The beginning and end are determined based on the total size a print or display data raster would fill if all potential dots were enabled.

By placing such an indicator, the processing element can easily locate the indicator and determine if a given raster contains printable data. If several rasters of non-printable data are found and the sum of these non-printable rasters fills a swath of non-printable data, then the processing element can avoid sending the unusable swath further through the system. This saves overall processing time for a given image with non-printable data. An alternative way to determine if a swath contains non-printable data is to check each byte or word individually. This can be time consuming, especially for large images.

Figure 5A:
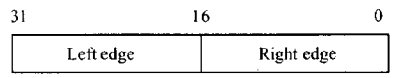
FIG. 5A depicts an exemplary edge indicator of 32 bits.
Figure 5B:
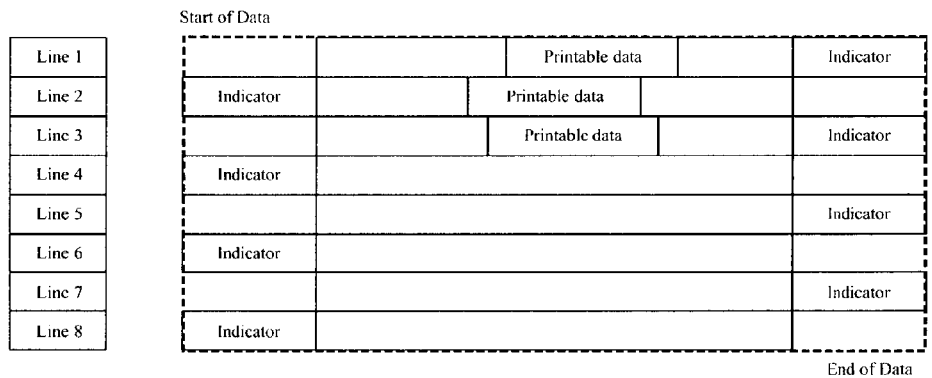
FIG. 5B is a logical diagram of potential output in memory with indicators.

In embodiments supporting line reversal, the indicator can be at the highest word order position of the data for processing in the forward direction, and the indicator can be at the lowest word order position of the data if the hardware is processing in the reverse direction. An embodiment including an indicator at the lowest word order position is illustrated in FIG. 5B and described in further detail below. In embodiments employing line reversal, such as that depicted in FIG. 5B, the physical start of data in memory need not include an indicator. In such an embodiment, the indicator could be placed at the end of the first line of data in memory if image data processing commences at the start of the first line. In embodiments not supporting line reversal, the indicator can be placed at either end of the line as appropriate based on the direction of data processing. As illustrated in FIG. 5A, the indicator in an exemplary embodiment contains 32 bits of values for the left edge and right edge of the data. The left edge can be represented in the upper 16 bits while the right edge is represented in the lower 16 bits. Those skilled in the art will recognize that other configurations are possible, including one in which the right edge can be represented in the upper 16 bits while the left edge is represented in the lower 16 bits. Those skilled in the art will also readily appreciate that indicators having more or fewer bits can be used within the scope of the present invention and further that the portions allocated to left and right edge information will typically be equal, however, some embodiments can incorporate unequal allocation such as in applications where either left or right sides can have a known greater tendency for non-printable data.

The left and right edge values are determined based on how many potential dot positions are to the right of the left and right printable data margins respectively. As a non-limiting example, assume that the left margin of printable data fell in dot position 16 from the right side of the original image. Also assume that the right margin of printable data fell in dot position 4 from the right side of the origin a image. This indicates that there is non-printable data outside of the 16th and 4th dot positions. For this example, the indicator would contain 0x000F in the left edge position and 0x0003 in the right edge position. The processing element would interpret this to mean that there are 15 dots to the right of the left margin and 3 dots to the right of the right margin. From this information and subsequent line indicators, the processing element can determine exactly how much of the output information is valid for continued processing.

In some embodiments, the indicator word can appear at either the beginning or end of a given raster line of error diffused output. In such embodiments, the indicator information will not be determined until an entire line has been processed, and the error diffusion processing element can operate in either forward or reverse directions. Therefore, once the error diffusion processing element has finished processing in the forward direction, the indicator will be placed at the end of the line. Also, once the error diffusion processing element has finished processing in the reverse direction, the indicator will be placed at the beginning of the line. In this embodiment, the indicator will be placed on word boundaries regardless of output data and the boundary that the output data falls on. Some embodiments can place the indicator word at some other known location rather than at the beginning or end of the line.

Figure 5C:
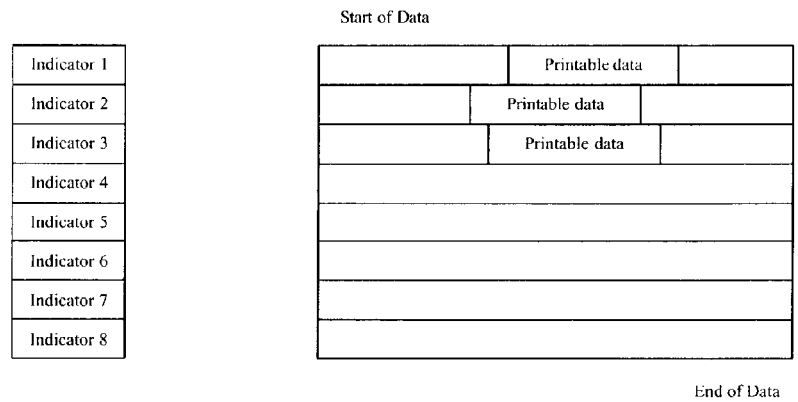
FIG. 5C is a logical diagram of indicators that are stored separately from image data in memory.

In another exemplary embodiment, the indicator word can be stored separately from the raster image data in an array, stack, list, or other appropriate data structure, as illustrated in FIG. 5C. Such an embodiment can otherwise provide identical functionality as a system in which indicators are embedded in image data.

The hardware error diffusion can be stored in a contiguous memory in the manner depicted in FIG. 5B. Lines 1-3 contain printable data. The processing element can determine this from the indicators and accordingly pass this information on to the next processing element. Note that lines 4-8 do not contain printable data. The processing element can determine this and discard the non-printable data. FIG. 5C illustrates and alternative embodiment in which the indicators are stored separately from the raster image data.

In addition or alternatively, the system processor can set an indicator in register space to inform the processing element if any printable data is present in the image as a whole. In an exemplary embodiment, this is indicator is one bit. This would give the processing element a check for discarding the entire image if it contains only non-printable data. Indicators for each line give the processing element a check for determining if and when data is unusable without having to investigate all of the output data. Thus, the total processing time when producing printable data within a processing pipeline can be reduced.

In some embodiments, dot counting can be accomplished within an error diffusion processing element that processes pixels sequentially. As the error diffusion process progresses from one pixel/dot location to the next, it is determined whether a dot is to be placed in a given location. This information can be used to enable a counter within the logic. As a dot is placed, the count will increment. After a block of data has been processed, a system processor can access this count to identify the total number of dots placed.

In addition, various embodiments of the invention can combine edge tags with one or more of the other error diffusion enhancements discussed herein, including without limitation, the parallel error diffusion processing elements, line reversal and buffering as discussed above, and the fast local memory as discussed below.

Fast Local Memory

In some embodiments, an error buffer of fast local memory, as discussed in further detail below, can be included on the same chip as and/or placed near to the error diffusion logic. The Floyd-Steinberg algorithm is a notable form of error diffusion; this algorithm generates a series of error values as each image line is transformed. These error values can be stored and read again when the next line of the image is transformed. These errors typically occupy as much storage space as one entire line of image.

In one exemplary embodiment, a buffer of fast local memory, such as SRAM, can be in the same ASIC as the error diffusion processing element, to retain the error values from one processed image line to the next. Fast local memory provides single-cycle access for both reading error values and writing back new values.

Figure 4A:
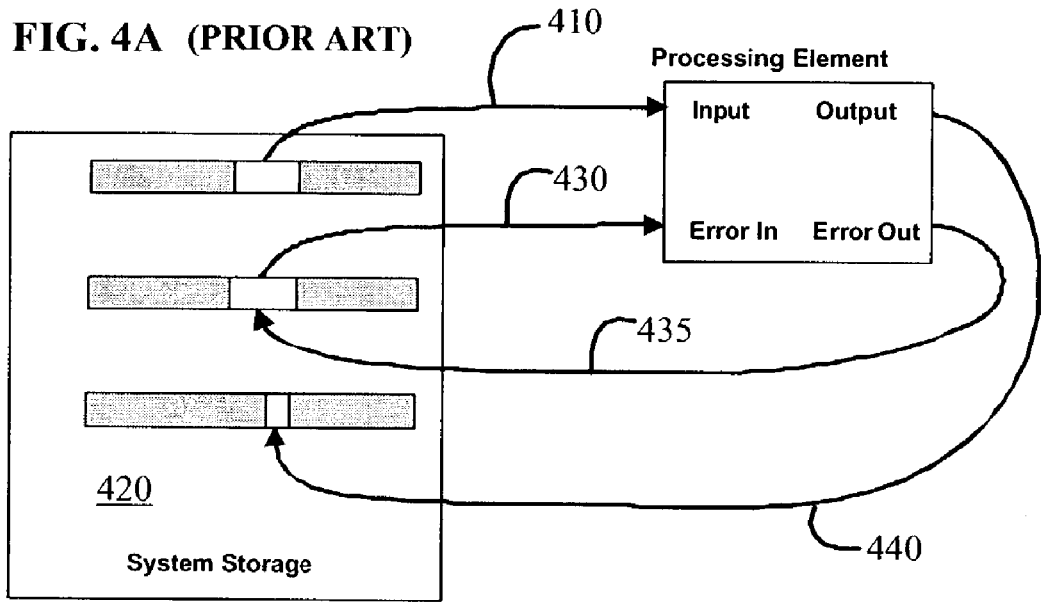
FIGS. 4A-B are block diagrams comparing data flow in error diffusion without a fast local memory (FIG. 4A), and with error diffusion including a fast local memory (FIG. 4B).

Inclusion of this fast local memory provides for improved processing efficiency. This efficiency is demonstrated by FIGS. 4A and 4B. Without a fast local memory processing a pixel of the input image as depicted in FIG. 4A proceeds as follows: the 8-bit pixel value 410 is read from system storage 420, the corresponding 8-bit error value 430 is read from system storage, the 1 or 2 bit output 440 is generated, and an error value 435 for the next pixel below is generated, for a total system storage transaction of 25 or 26 bits. In contrast, error diffusion processing with a fast local memory 450 depicted in FIG. 4B proceeds as follows: read in the 8-bit image value 410, apply the error value 430 stored in the fast local memory 450, compare to the threshold, generate the 1 or 2 bit output data 440 and store the new error value 435 in the fast local memory 450. This requires only a total system storage transaction of 9 or 10 bits, resulting in as much as 270% greater theoretical performance.

One error value is required for each pixel position in a single line of image data. Once the current line is complete, all of the old error values have been read and replaced with new error values relevant to the next line of data to be processed. Thus, in this embodiment, the local error buffer has a number of spaces equal to the maximum number of pixels that will need to be processed in a single line of input image data.

Figure 4B:
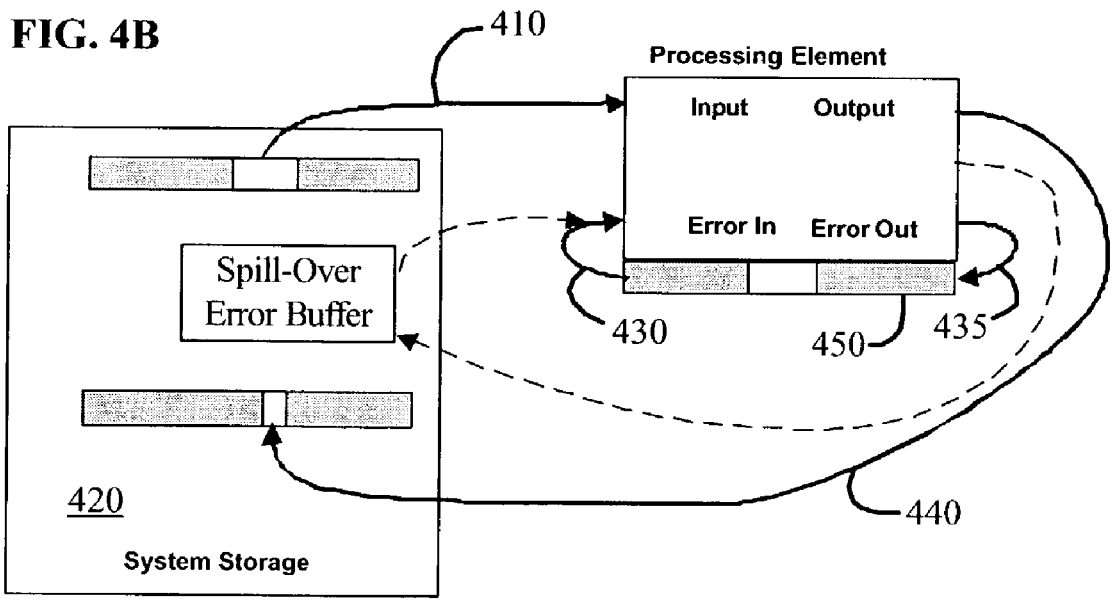

In some embodiments, if it is necessary to process an input image line with more pixels than there are corresponding spaces in the local error buffer, additional errors may 'spill' into system storage, as indicated by the dashed line in FIG. 4B. Assuming an error buffer with spaces for retaining M errors, if an input line of N (N>M) pixels is processed, the first M pixels of the line would be read from stored to the local error buffer. However, those pixels M+1 to N would be processed with errors read from and stored to the system storage. In this way, the benefit of the local error buffer is retained even though the processed line is greater than the buffer. Only those pixels in excess of M would incur the performance penalty of accessing system storage. In one exemplary embodiment, the system storage comprises a local memory communicatively coupled with one or more error diffusion processing elements.

In addition, various embodiments of the invention can combine fast local memory with one or more of the other error diffusion enhancements discussed above, including without limitation, the parallel error diffusion processing elements, line reversal, buffering, and edge tags.

Other aspects of the invention may be found from the attached drawings and other related materials such as a detailed review of the various functions offered by the present invention, which are integral parts of this disclosure. Moreover, other embodiments of the invention will be apparent to those skilled in the art from consideration of the specification and practice of the invention disclosed herein. It is intended that the specification and examples be considered as exemplary only. Accordingly, the scope of the invention is to be determined by the claims below rather than being limited to the specifically described embodiments above.

What is claimed is:

1. A system for processing color image data comprising a plurality of pixels, the system comprising a system processor comprising one or more processing elements, wherein the one or more processing elements comprise a plurality of error diffusion processing elements that perform error diffusion on a selected pixel in parallel with respect to two or more colorant values associated with the selected pixel, wherein the error diffusion processing elements are integrally formed with a fast local memory in the same electronic device, the error diffusion processing elements having an image data input receiving the color image data read from a system data store one pixel position at a time, an error input receiving a diffusion error applicable to the pixel value at that position, a dot output providing the dot placement output data for storage in the system data store, and an error output providing the error value for a plurality of other pixel positions, the fast local memory having a buffer input receiving the error for buffering therein and a buffer output providing the buffered error to the error input of the error diffusion processing elements.

2. The system claimed in claim 1, wherein the error diffusion processing elements and fast local memory are integrally formed in an ASIC or an FPGA.

3. A system for processing color image data in a printing device, comprising:
   a system data store for storing the color image data and storing dot placement output data; and
   error diffusion logic integrally formed with a fast local memory in the same electronic device, the error diffusion logic having an image data input receiving the color image data read from the system data store one pixel position at a time, an error input receiving a diffusion error applicable to the pixel value at that position, a dot output providing the dot placement output data for storage in the system data store, and an error output providing the error value for a plurality of other pixel positions, the fast local memory having a buffer input receiving the error for buffering therein and a buffer output providing the buffered error to the error input of the error diffusion logic.

4. The system claimed in claim 3, wherein the error diffusion logic and fast local memory are integrally formed in an ASIC or an FPGA.

5. The system claimed in claim 3, wherein the error is received by the system data store for buffering therein when the fast local memory is too full to buffer further error, the error buffered in the system data store being receivable by the error input of the processing element along with error buffered in the fast local memory.

6. The system claimed in claim 3, wherein:
the error diffusion logic comprises a plurality of error diffusion processing elements operable on a selected pixel in parallel to produce error data with respect to two or more colorant values associated with the selected pixel, each error diffusion processing element associated with and integrally formed with a fast local memory; and
the error data produced by a first error diffusion processing element is received by the fast local memory associated with a second error diffusion processing element for buffering therein when the fast local memory associated with the first error diffusion processing element is too full to buffer further error.

7. A method for processing color image data in a printing device, comprising the steps of:
storing color image data and dot placement output data in a system data store; and
error diffusion logic receiving the color image data read from the system data store one pixel position at a time and receiving a diffusion error applicable to the pixel value at that position;
generating dot placement output data for storage in the system data store in response to the pixel value;
generating an error value for a plurality of other pixel positions; and
storing the error value in a selected memory, the selected memory being a selection as between one of a first memory and a second memory, wherein the second memory is selected if the first memory is full.

8. A method for processing color image data in a printing device, comprising the steps of:
storing color image data and dot placement output data in a system data store; and
error diffusion logic receiving the color image data read from the system data store one pixel position at a time and receiving a diffusion error applicable to the pixel value at that position;
generating dot placement output data for storage in the system data store in response to the pixel value;
generating an error value for a plurality of other pixel positions; and
storing the error value in a fast local memory integrally formed with the error diffusion logic in the same electronic device,
wherein: the error diffusion logic comprises a plurality of error diffusion processing elements, each having a fast local memory associated with and integrally formed therewith in the same electronic device; and an error value produced by a first error diffusion processing element is received by the fast local memory associated with a second error diffusion processing element for buffering therein when the fast local memory associated with the first error diffusion processing element is too full to buffer further error values.

9. A method for processing color image data in a printing device, comprising the steps of:
storing color image data and dot placement output data in a system data store; and
error diffusion logic receiving the color image data read from the system data store one pixel position at a time and receiving a diffusion error applicable to the pixel value at that position;
generating dot placement output data for storage in the system data store in response to the pixel value;
generating an error value for a plurality of other pixel positions; and
storing the error value in a fast local memory integrally formed with the error diffusion logic in the same electronic device; and
storing the error value in system data store for buffering therein when the fast local memory is too full to buffer further error values.

10. A system for processing color image data represented by a plurality of rasters, comprising:
a processing element having an error diffusion processing element having an input receiving the color image data and an output producing dot placement output data;
a color conversion system providing the color image data; and
a first-in-first-out (FIFO) buffer having an input receiving the color image data from the color conversion system and an output providing buffered color image data to the error diffusion processing element,
wherein the processing element is configured to determine if a given raster of the plurality of rasters contains printable data.

11. The system of claim 10, wherein the color conversion system comprises a colorant lookup table.

12. The system of claim 10, wherein:
the error diffusion processing element is one of a plurality of error diffusion processing elements tat perform error diffusion on a selected pixel in parallel with respect to two or more colorant values associated with the selected pixel;
the color conversion system is one of a plurality of color conversion systems, each providing one of the colorant values; and
the FIFO buffer is one of a plurality of FIFO buffers, each having an input receiving the color image data from a corresponding one of the color conversion systems and an output providing buffered color image data to a corresponding one of the error diffusion processing elements.

13. The system of claim 11, wherein the error diffusion processing element, the colorant lookup table and the FIFO buffer are integrally formed together in an ASIC or an FPGA.

14. The system of claim 10, wherein each error diffusion processing element computes a one or two bit dot value.

15. The system of claim 10, wherein the plurality of error diffusion processing elements consists of exactly four elements that perform error diffusion on a selected pixel in parallel.

16. The system of claim 15, wherein each of the four error diffusion processing elements further processes one channel selected from the group consisting of cyan, magenta, yellow and black.

17. The system of claim 10, wherein the plurality of error diffusion processing elements consists of exactly three elements that perform error diffusion on a selected pixel in parallel.

18. The system of claim 17, wherein each of the three error diffusion processing elements further processes three channels selected from the group consisting of cyan, magenta, yellow and black.

19. The system of claim 10, wherein the plurality of error diffusion processing elements consists of exactly two elements that perform error diffusion on a selected pixel in parallel.

20. The system of claim 19, wherein each of the two error diffusion processing elements further processes two channels selected from the group consisting of cyan, magenta, yellow and black.

21. A system for processing color image data in a printing device, comprising:
  system data store for storing the color image data and dot placement output data; and
  error diffusion logic having an input reading the color image data from the system data store and having an output producing the dot placement output data, the error diffusion logic further having tagging logic storing an indicator in relation to corresponding dot placement output data to indicate whether a raster represented by the corresponding dot placement output data contains printable data.

22. The system claimed in claim 21, wherein the indicator is embedded in output data stream.

23. The system claimed in claim 21, wherein the indicator is stored in a separate list of indicators.

24. The system claimed in claim 21, wherein the indicator describes a dot position at which printable data begins relative to an edge of the raster.

25. The system claimed in claim 21, wherein the error diffusion logic detects the beginning or end of a raster line, depending on whether the direction of processing is forward or reverse, and continues processing in the opposite direction starting either at the beginning or the end of a next line.

26. The system claimed in claim 25, wherein the error diffusion logic stores the indicator at the lowest word order position of the data if processing in the reverse direction and at the highest word order position of the data if processing in the forward direction.

27. The system claimed in claim 21, wherein the error diffusion logic counts a total number of printable dots.

28. A method for processing color image data in a printing device, comprising:
  storing the color image data and dot placement output data in a system data store; and
  receiving the color image data read from the system data store and producing the dot placement output data utilizing error diffusion logic; and
  storing an indicator in relation to corresponding dot placement output data to indicate whether a raster represented by the corresponding dot placement output data contains printable data.

29. The method claimed in claim 28, wherein the step of storing an indicator comprises embedding the indicator in an output stream of dot placement output data.

30. The method claimed in claim 28, wherein the step of storing an indicator comprises storing the indicator in a list of indicators separate from an output stream of dot placement output data.

31. The method claimed in claim 28, wherein the indicator describes a dot position at which printable data begins relative to an edge of the raster.

32. The method claimed in claim 28, wherein the error diffusion logic detects the beginning or end of a raster line, depending on whether the direction of processing is forward or reverse, and continues processing in the opposite direction starting either at the beginning or the end of a next line.

33. The method claimed in claim 28, wherein the error diffusion logic stores the indicator at the lowest word order position of the data if processing in the reverse direction and at the highest word order position of the data if processing in the forward direction.

34. The method claimed in claim 28, wherein the error diffusion logic counts a total number of printable dots.

* * * * *